(12) United States Patent
Skovira

(10) Patent No.: US 7,331,048 B2
(45) Date of Patent: Feb. 12, 2008

(54) BACKFILL SCHEDULING OF APPLICATIONS BASED ON DATA OF THE APPLICATIONS

(75) Inventor: Joseph F. Skovira, Owego, NY (US)

(73) Assignee: International Business Machines Corporation, Armonk, NY (US)

( * ) Notice: Subject to any disclaimer, the term of this patent is extended or adjusted under 35 U.S.C. 154(b) by 653 days.

(21) Appl. No.: 10/406,985

(22) Filed: Apr. 4, 2003

(65) Prior Publication Data

US 2004/0199918 A1 Oct. 7, 2004

(51) Int. Cl.
*G06F 9/46* (2006.01)
*G06F 15/16* (2006.01)

(52) U.S. Cl. .................. 718/102; 709/233; 718/104

(58) Field of Classification Search ........ 709/201–207, 709/216–219, 226, 229, 233, 235; 719/311; 718/100–108; 707/10, 201–206
See application file for complete search history.

(56) References Cited

U.S. PATENT DOCUMENTS

| | | | |
|---|---|---|---|
| 4,918,595 A | 4/1990 | Kahn et al. ................. 364/200 |
| 5,349,682 A * | 9/1994 | Rosenberry ................. 718/102 |
| 5,867,716 A | 2/1999 | Morimoto et al. ..... 395/750.02 |
| 6,076,174 A * | 6/2000 | Freund .......................... 714/47 |
| 6,098,091 A * | 8/2000 | Kisor ........................... 709/202 |
| 6,345,287 B1 | 2/2002 | Fong et al. .................. 709/102 |
| 6,366,945 B1 | 4/2002 | Fong et al. .................. 709/104 |
| 7,082,606 B2 * | 7/2006 | Wood et al. ................. 718/102 |
| 7,143,412 B2 * | 11/2006 | Koenen ....................... 718/102 |
| 2002/0083185 A1* | 6/2002 | Ruttenberg et al. ......... 709/232 |
| 2002/0087623 A1* | 7/2002 | Eatough ...................... 709/203 |

FOREIGN PATENT DOCUMENTS

WO WO9961985 A1 12/1999

OTHER PUBLICATIONS

"Method of Compute Resource Allocation in a Batch Job Submission environment" IBM Technical bulletin Jul. 1997; p. 1-2.*

(Continued)

*Primary Examiner*—William Thomson
*Assistant Examiner*—Charles E Anya
(74) *Attorney, Agent, or Firm*—Geraldine Monteleone, Esq.; Kevin P. Radigan, Esq.; Heslin Rothenberg Farley & Mesiti, P.C.

(57) ABSTRACT

Backfill scheduling techniques are used to schedule execution of applications, either on a local computing unit or a remote unit. In determining whether a particular application is to be scheduled to execute on a local unit or a remote unit, the data associated with that application is considered. As examples, an amount of data to be moved, availability of communication channels, and/or availability of remote data storage resources are considered.

15 Claims, 2 Drawing Sheets

OTHER PUBLICATIONS

IBM Technical Disclosure Bulletin (TDB) "Method of Computer Resource Allocation in a Batch Job Submission environment" Delphion Jul. 1997 pp. 1-2.*

"Method of Computer Resource Allocation in a Batch Job Submission Environment", IBM Technical Disclosure Bulletin, Jul. 1997, vol. 40, Pub. No. 7, pp. 7-8.

"A Simulation Model of Backfilling and I/O Scheduling in a Partitionable Parallel System", Helen D. Karatza, Proceedings of the 2000 Winter Simulation Conference, pp. 496-505.

"Job Scheduling in the Presence of Multiple Resource Requirements", W. Leinberger, G. Karypis, V. Kumar.

"Scheduling Best-Effort and Real-Time Pipelined Applications on Time-Shared Clusters", Yanyong Zhang, Anand Sivasubramaniam, pp. 209-218.

"The EASY-LoadLeveler API Project", J. Skovira, W. Chan, H. Zhou, D. Kifka, Job Scheduling Strategies for Parallel Processing, edited by Dror G. Feitelson and Larry Rudolph, pp. 41-47, Springer-Verlag, 1996. Lecture Notes on Computer Science, vol. 1162.

* cited by examiner

BACKFILL SCHEDULING OF APPLICATIONS BASED ON DATA OF THE APPLICATIONS

TECHNICAL FIELD

This invention relates, in general, to the backfill scheduling of applications, and in particular, to a backfill scheduling capability that takes into consideration data of the applications in backfill scheduling the applications.

BACKGROUND OF THE INVENTION

Scheduling techniques are used to schedule applications in a computing environment such that the resources of the environment are efficiently utilized. One type of scheduling technique is a backfill scheduling technique, which allows applications to run out of order as long as they do not affect the start time of an application already scheduled to execute. In particular, backfill scheduling techniques determine when a free set of processors will be available at a future time and schedule applications to be executed at that time.

Backfill scheduling techniques have progressed over the years to become more efficient. However, further enhancements are still desired. For example, a need exists for a backfill scheduling capability that considers the data of the applications in scheduling those applications.

SUMMARY OF THE INVENTION

The shortcomings of the prior art are overcome and additional advantages are provided through the provision of a method of facilitating backfill scheduling of applications of a computing environment. The method includes, for instance, determining on which computing unit of a plurality of computing units of the computing environment an application is to be scheduled to execute, the determining being based, at least in part, on data of the application; and backfill scheduling the application for execution, in response to the determining.

System and computer program products corresponding to the above-summarized method are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, a backfill scheduling capability is provided that takes into consideration data of applications in scheduling those applications for execution. For example, a determination is made as to which computing unit of a plurality of computing units an application is to be scheduled to execute, and that determining is based, at least in part, on data of the application.

Figure 1:
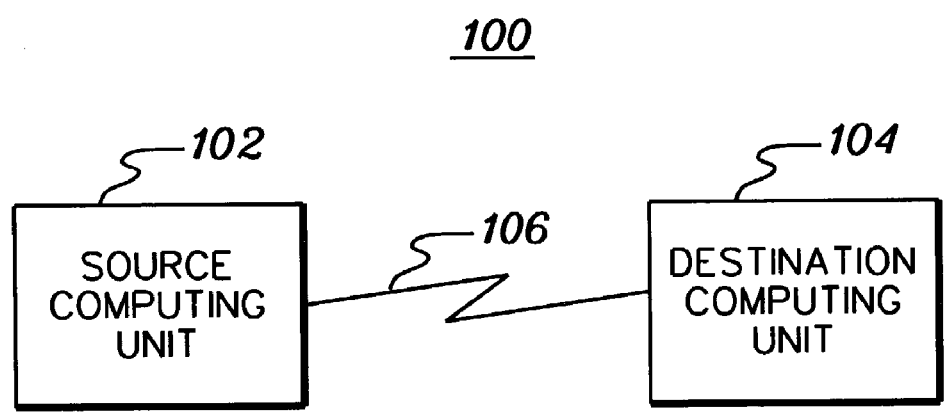
FIG. 1 depicts one embodiment of a computing environment to incorporate and use one or more aspects of the present invention.

One embodiment of a computing environment to incorporate and use one or more aspects of the present invention is described with reference to FIG. 1. In one example, computing environment 100 is a grid computing environment including, for instance, a source computing unit 102 and one or more destination computing units 104. The source computing unit is referred to herein as a local unit, while one or more of the destination computing units are referred to as remote units. A computing unit (102 and/or 104) includes one or more nodes capable of processing applications. In a computing unit having a plurality of nodes, the nodes are coupled to one another via, for instance, a LAN or other type of connection. A node is, for instance, a LINUX workstation; a p-series machine, such as a p Series 690, offered by International Business Machines Corporation, Armonk, N.Y.; or a general parallel machine. Various other types of nodes can also be employed, and therefore, those described herein are just examples. A computing unit may include homogeneous or heterogeneous nodes, and similarly, each unit may be the same or different from one another. The computing units are coupled to one another via, for instance, a high-speed link 106, such as the internet. Other types of links, switches or other connections may also be used.

To efficiently utilize the resources of the computing environment, scheduling techniques are used to schedule execution of applications of the environment. One type of scheduling technique is a backfill scheduling technique that determines when resources will be available at a later time for use by waiting applications. One example of a backfill scheduling technique is described in "The EASY-LoadLeveler API Project", Job Scheduling Strategies for Parallel Processing, edited by Dror G. Feitelson and Larry Rudolph, pp. 41-47, Springer-Verlag, 1996, Lecture Notes on Computer Science Vol. 1162, which is hereby incorporated herein by reference in its entirety.

In one example, there are three phases to a backfill scheduling technique. One phase includes starting applications immediately on available resources (free node phase); another phase includes computation of when the next waiting application is to run and what resources it needs (shadow time computation, further described below); and a third phase indicates which jobs may run on available resources without impacting the start of the next job (backfill). The backfill scheduling technique may indicate that an application is to be moved from one computing unit to another computing unit to be scheduled for execution thereon. When an application is moved, the data associated with the application is also moved. However, the movement of the data may take longer than the application, and therefore, the application may have to wait a significant amount of time for the data to arrive before being executed. This is counterproductive and may signify that the application should not have been moved.

Thus, in order to facilitate determining whether an application is to be moved from a source computing unit to a destination computing unit, the backfill scheduling technique is enhanced, in accordance with an aspect of the present invention, to consider the data associated with the application. In one embodiment, the backfill scheduling technique considers one or more aspects relating to the data of the application. These aspects include, for instance, how much data there is to move (e.g., input (code and data) and results); the availability of communication channels between the source and destination sites; and/or the availability of data storage resources at the destination unit.

One embodiment of the logic associated with determining on which computing unit of a plurality of computing units an application is to be scheduled to execute is described with reference to FIG. 2. In one example, this logic is included within a scheduler executing on one or more computing units of the computing environment. A scheduler that may include such logic is, for instance, LoadLeveler, offered by International Business Machines Corporation, Armonk, N.Y.

Figure 2:
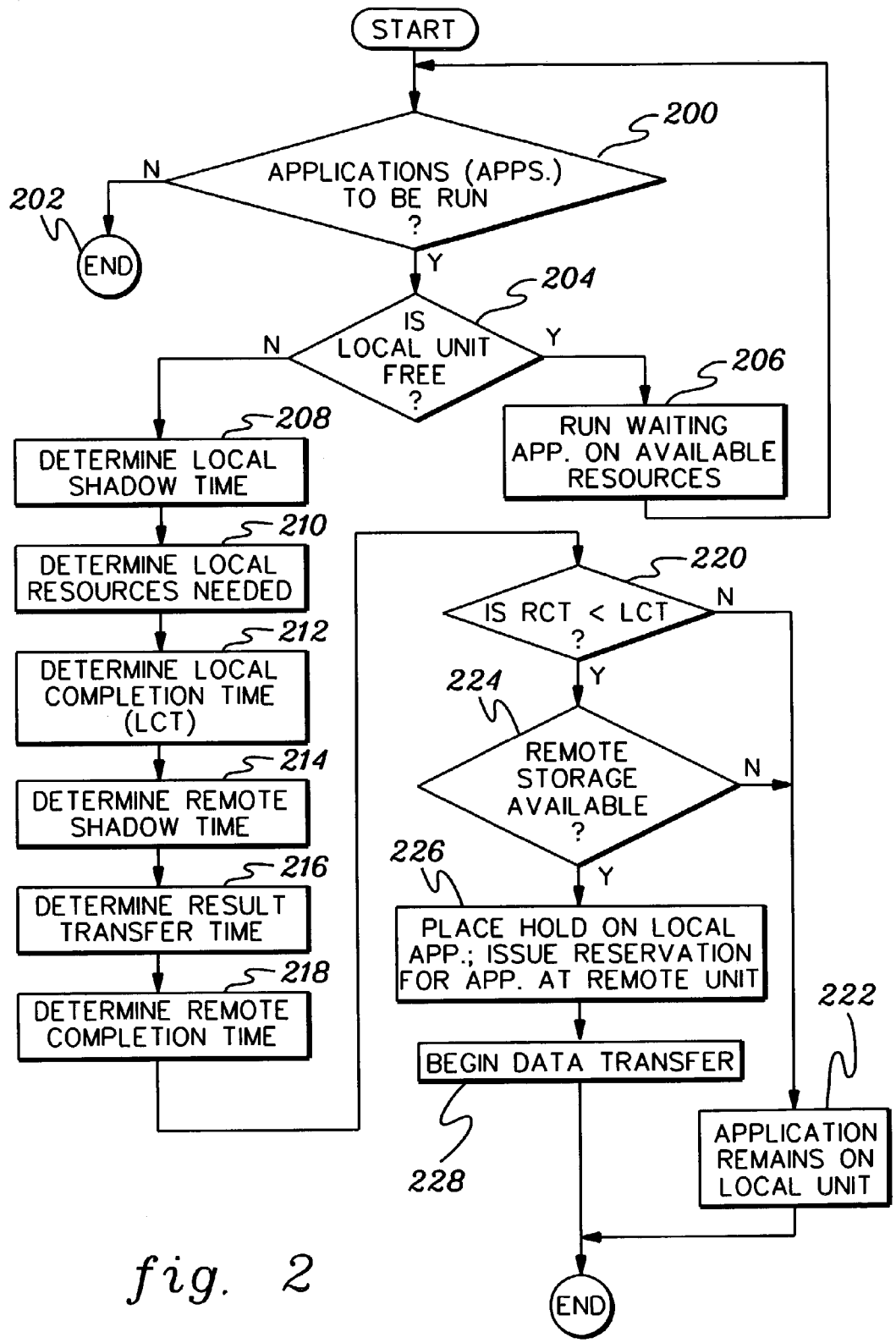
FIG. 2 depicts one embodiment of the logic associated with backfill scheduling of applications, in accordance with an aspect of the present invention.

Referring to FIG. 2, initially, a determination is made as to whether there are one or more applications (or jobs) to be run, INQUIRY 200. If there are no applications to be run, then processing is complete, STEP 202. However, if there is at least one application to be run, then a further determination is made as to whether the resources of the local computing unit are available, INQUIRY 204. If the computing unit in which the application is currently resident is free, then a waiting application (e.g., the first or another selected application) is run on the available resources of that local unit, STEP 206. Thereafter, processing continues with INQUIRY 200. However, if the local unit is not free, then processing is performed to determine whether the application is to remain at the local unit or be transferred to another computing unit. In one example, in order to make this determination, various steps are performed, as described herein.

One step includes determining a local shadow time, which indicates how long the application needs to wait for available local resources, STEP 208. That is, a determination is made as to the estimated completion time for the one or more applications preventing execution of the waiting application. For instance, assume a local computing unit has 8 nodes and a local job queue includes the following: an application J1, which is running on 8 nodes and has a 20 hour completion time; and an application J2, which is waiting for 4 nodes and has an estimated completion time of 1 hour. In this example, the local shadow time (LST) is 20 hours, which is the estimated completion time of J1. It should be noted that in other examples there may be more than one application running that may affect the local shadow time.

A determination is also made as to the local resources needed, STEP 210. This represents what resources the waiting application will run on in the future, and is determined by checking the requested amount of resources for the particular application (e.g., J2 requests 4 nodes).

Additionally, a determination is made as to a local completion time (LCT), which is equal to the local shadow time plus the wallclock estimate for the waiting application (i.e., the estimated time to complete execution of the waiting application), STEP 212. For instance, the local completion time for the above example is equal to the local shadow time (e.g., 20 hours) plus the wallclock estimate for the waiting application (e.g., 1 hour), which is 21 hours.

In addition to the above, a remote shadow time is determined, STEP 214. In one example, the remote shadow time (RST) is the greater of the shadow time on the remote unit or the estimated data transfer time to the remote unit. For instance, assume there is another unit with 8 nodes that has the following remote job queue: an application J100, which is running on 4 nodes with a 10 hour completion time. Since J100 is only using 4 out of the 8 nodes, there are 4 available nodes. Further, since J2 (the waiting application) only needs 4 nodes, the shadow time on the remote unit is equal to 0, since the resources are available. The transfer time indicates how long it takes to transfer the input data. Thus, assume that the computing units are coupled by a 100 kbyte/sec link and that the waiting application, J2 has 20 MBytes of total input data. In that case, the transfer time is 200 seconds. Therefore, the remote shadow time is 200 seconds, the greater of the shadow time on the remote unit and the estimated data transfer time.

Further, a result transfer time (RTT) is determined, which is the time employed to return results to the local machine, STEP 216. As one example, the result transfer time for J2, which has 10 MBytes of total output data coming over a 100 kbyte/sec link, is 100 seconds.

Additionally, a remote completion time (RCT) is determined, STEP 218. As one example, the remote completion time is set equal to the remote shadow time (e.g., 200 seconds) plus the wallclock estimate (e.g., 1 hour) plus the result transfer time (e.g., 100 seconds). Thus, in this example, the remote completion time is 1 hour, 5 minutes.

Subsequently, a determination is made as to whether the remote completion time is less than the local completion time, INQUIRY 220. If the remote completion time is not less than the local completion time, then the application remains on the local unit to be processed when the resources become available, STEP 222. However, if the remote completion time is less than the local completion time, then a further determination is made as to whether remote storage is available, INQUIRY 224. If not, then the application remains on the local unit, STEP 222. Otherwise, a hold is placed on the local application, and a reservation is issued for the application at the remote unit, STEP 226. Thereafter, the data transfer begins, STEP 228.

On the remote machine, a reservation for J2, 200 seconds in the future is added to the job mix, and the transferred data for J2 is stored. After the data arrives, J2 may be started. When J2 runs to completion, the 10 MBytes of results is transferred to the local unit. Then, the input data, code and results are removed from the remote unit. The results are then available on the local unit.

As described above, the backfill scheduling technique is enhanced to perform scheduling based on data considerations. In one embodiment, the technique takes into consideration how much data there is to move (input (code and data) and results); the availability of any communication channels between the source and destination units; and the availability of data storage resources at the destination unit. However, these considerations are only examples. In other embodiments, one or more of the considerations are taken into account. Further, the considerations may be modified and/or other considerations may also be considered. For instance, the consideration of the amount of data may only consider input data. Other changes, additions, and/or deletions are possible.

The backfill scheduling technique provides an estimated start time for a waiting application. However, the estimated start time is just that, an estimate. If applications complete early (e.g., underestimated wallclock time, unexpected job end, etc.), the related terms of shadow time and estimated start time can be changed to earlier time estimates. However, there is still a fixed setup component of an application running on a destination machine, which includes the data transfer time that is still to expire before the application may start. Thus, the application has to wait longer to start (in effect, the data transfer time defines the shadow time for those situations in which an application completes early).

In one embodiment, it is assumed that the entire network bandwidth is available (e.g., full availability of communication channels). However, this may not be true. Thus, in a further embodiment, the estimated data transfer times are improved. For example, one or more adjustment factors are included in the backfill scheduling technique to account for variability in available network bandwidth. As one example, the estimated data transfer time to the remote unit (of STEP 214) includes an adjustment to underestimate available transfer time. For example, the actual transfer time is theoretically established or experimentally measured, and then, that value is adjusted to account for bandwidth variations. The adjustment can be based on historical measurements of the network performance, which may give some idea about how much bandwidth the scheduler can expect, while moving the application in question. For instance, the tracking of a 24 hour period of activity may yield periodic trends, which could be taken into account. In one example, the adjustment, is equal to, for instance, a percentage of the available transfer time. Thus, the estimated data transfer time is equal to the actual estimate plus an adjustment.

Since it is recognized that the tracking of an available resource, such as a network connection, can be difficult, in another embodiment, the data transfer mechanism is guaranteed some reserved bandwidth for the duration of the data transfer.

As a further example of providing an adjustment factor, the result transfer time (216) is adjusted by setting it equal to the actual estimate plus an adjustment, which is similarly determined, as described above, but may or may not be the same as the adjustment for the data transfer time.

The backfill computation is performed periodically. For instance, because of the non-linear nature with which the job stream changes, the backfill computation is performed periodically to adapt to these changes (e.g., anywhere from a continuous rate to a defined interval, such as once per minute). The available bandwidth can be monitored and the start time of the waiting application can be adjusted accordingly. Since the bandwidth estimate is computed with some degree of uncertainty, shrinking bandwidth may be contained up to a certain point. However, if bandwidth continues to deteriorate, eventually, the start time will be pushed into the future. Since this is undesirable for the backfill technique, an alternative would be to begin employing alternative communication channels, if available, or re-examining the possibility of running the applications locally. Thus, it is possible to respond to changes in available bandwidth over time.

There is also a backfill random variable to consider, in another embodiment. A measurement of how accurate shadow time estimates have been in the past can be obtained. By adapting to this measure, it is possible to predict more accurately when a job slot would appear on a remote machine (independent of network availability). This would provide a better opportunity to accurately schedule available network bandwidth for a particular application.

As the job queue develops over time, it may become clear that the waiting application can now be run on available resources on the source machine. If this should happen, data transfer can be suspended, the partial copy at the destination unit discarded, and the application waits to run on the local unit. The impact of this is a temporary use of network bandwidth and remote storage, which might have been used for alternative tasks.

Although in the embodiments described above, the process has been described for the first waiting task on a machine, the process can be extended to applications waiting further in the job queue. For example, in one embodiment, a search is made for tasks in the queue which have relatively modest data requirements (since this information is associated with job metadata). For those deep in the queue with small data requirements, the decision might be made to apply these to an idle, remote machine. Note that deep and small data requirements are relative terms which would be quantified, either by static or administrative settings, or in another embodiment, adjusted dynamically depending on a variety of factors (such as available network bandwidth, or queue size). In a further extension, the backfill technique can be executed for jobs deeper within the queue to determine approximate starting times. Once these are determined, they can be compared with estimated start times on remote units, including data transfer computations, as described herein. If an application might start much sooner on a remote unit, it could be moved to the destination unit for execution.

As a further enhancement, an application may commence executing on a remote unit, in response to some of the data arriving at the remote unit, but before all of the data has arrived. This is particularly useful for an application that traverses the data in a predictable manner. This computation is added to the estimation of shadow time.

Described in detail above is a technique for integrating data movement with scheduling techniques. Advantageously, a predictable approach to running remote applications, which effectively hides the process of transferring data to a remote unit, is provided.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. As one particular example, the check for remote storage can be performed earlier in the process. Further, the various determinations can be performed in a differing order. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of facilitating backfill scheduling of applications of a computing environment, said method comprising:
   determining on which computing unit of a plurality of computing units of the computing environment an application is to be scheduled to execute, the application having an amount of data associated therewith, said determining being based, at least in part, on the amount of data of associated with the application;
   backfill scheduling the application for execution, in response to the determining;
   wherein the plurality of computing units comprise a local unit and a remote unit;
   wherein the determining comprises considering an estimated amount of time it would take to transfer the data to the remote unit and determining whether the application is to be scheduled on the local unit or the remote unit; and
   applying an adjustment to the estimated amount of time considered to provide an adjusted amount of time, and wherein the determining comprises considering the adjusted amount of time, wherein the adjust amount of time is the estimated amount of time plus a percentage of the estimated amount of time.

2. The method of claim 1, wherein the determining comprises considering availability of one or more communication channels between at least a portion of the computing units of the plurality of computing units.

3. The method of claim 1, wherein determining comprises considering availability of one or more storage resources of the remote unit in determining whether the application is to be scheduled on the local unit or the remote unit.

4. The method of claim 1, further comprising applying an adjustment to the amount of time considered to provide an adjusted amount of time, and wherein the determining comprises considering the adjusted amount of time, wherein the adjusted amount of time is a shadow time on the remote unit when the shadow time is greater than the estimated amount of time it would take to transfer the data to the remote unit, the shadow time indicating how long the application will need to wait for reQuired resources to execute on the remote unit.

5. The method of claim 1, wherein said determining comprises:
   determining a remote completion time of the application, the remote completion time being the sum of a remote shadow time for execution of the application on the remote unit, an estimated time for executing the application on the remote unit, and a resultant transfer time required to return application execution results from the remote unit to the local unit, wherein the remote shadow time is the greater of a shadow time on the remote unit and the estimated amount of time it would take to transfer the data associated with the application from the local unit to the remote unit;
   determining a local completion time of the application on the local unit, the local completion time being the sum of a local shadow time and an estimated time for execution of the application on the local unit;
   comparing the remote completion time and the local completion time; and
   selecting the computing unit in which the application is to be scheduled to execute, in response to the comparing, wherein the selected computing unit is one of the local unit and the remote unit.

6. The method of claim 5, further comprising determining whether remote storage is available, and wherein the selecting is further in response to the determining of the remote storage.

7. A system of facilitating backfill scheduling of applications of a computing environment, said system comprising:
   means for determining on which computing unit of a plurality of computing units of the computing environment an application is to be scheduled to execute, the application having an amount of data associated therewith, said determining being based, at least in part, on the amount of data of associated with the application;
   means for backfill scheduling the application for execution, in response to the determining;
   wherein the plurality of computing units comprise a local unit and a remote unit;
   wherein the means for determining comprises means for considering an estimated amount of time it would take to transfer the data to the remote unit and determining whether the application is to be scheduled on the local unit or the remote unit; and
   means for applying an adjustment to the estimated amount of time considered to provide an adjusted amount of time, and wherein the means for determining comprises means for considering the adjusted amount of time, wherein the adjusted amount of time is the estimated amount of time plus a percentage of the estimated amount of time.

8. The system of claim 7, wherein the means for determining comprises means for considering availability of one or more communication channels between at least a portion of the computing units of the plurality of computing units.

9. The system of claim 7, wherein the determining comprises considering availability of one or more storage resources of the remote unit in determining whether the application is to be scheduled on the local unit or the remote unit.

10. The system of claim 7, further comprising means for applying an adjustment to the amount of time considered to provide an adjusted amount of time, and wherein the means for determining comprises means for considering the adjusted amount of time, wherein the adjusted amount of time is a shadow time on the remote unit when the shadow time is greater than the estimated amount of time it would take to transfer the data to the remote unit, the shadow time indicating how long the application will need to wait for required resources to execute on the remote unit.

11. The system of claim 7, wherein said means for determining comprises:
    means for determining a remote completion time of the application, the remote completion time being the sum of a remote shadow time for execution of the application on the remote unit, an estimated time for executing the application on the remote unit, and a resultant transfer time required to return application execution results from the remote unit to the local unit, wherein the remote shadow time is the greater of a shadow time on the remote unit and the estimated amount of time it would take to transfer the data associated with the application from the local unit to the remote unit;
    means for determining a local completion time of the application on the local unit, the local completion time being the sum of a local shadow time and an estimated time for execution of the application on the local unit;

means for comparing the remote completion time and the local completion time; and means for selecting the computing unit in which the application is to be scheduled to execute, in response to the comparing, wherein the selected computing unit is one of the local unit and the remote unit.

12. The system of claim 11, further comprising means for determining whether remote storage is available, and wherein the means for selecting is further in response to the determining of the remote storage.

13. At least one program storage device readable by a machine, tangibly embodying at least one program of instructions executable by the machine to perform a method of facilitating backfill scheduling of applications of a computing environment, said method comprising:

determining on which computing unit of a plurality of computing units of the computing environment an application is to be scheduled to execute, the application having an amount of data associated therewith, said determining being based, at least in part, on the amount of data of associated with the application;

backfill scheduling the application for execution, in response to the determining;

wherein the plurality of computing units comprise a local unit and a remote unit;

wherein the determining comprises considering an estimated amount of time it would take to transfer the data to the remote unit and determining whether the application is to be scheduled on the local unit or the remote unit and applying an adjustment to the estimated amount of time considered to provide an adjusted amount of time, and wherein the determining comprises considering the adjusted amount of time, wherein the adjust amount of time is the estimated amount of time plus a percentage of the estimated amount of time.

14. The at least one program storage device of claim 13, wherein the determining comprises considering availability of one or more communication channels between at least a portion of the computing units of the plurality of computing units.

15. The at least one program storage device of claim 13, further comprising applying an adjustment to the estimated amount of time considered to provide an adjusted amount of time, and wherein the determining comprises considering the adjusted amount of time, wherein the adjusted amount of time is a shadow time on the remote unit when the shadow time is greater than the estimated amount of time it would take to transfer the date to the remote unit, the shadow time indicating how long the application will need to wait for reciuired resources to execute on the remote unit.

* * * * *